June 3, 1930.    C. SCHAEFFER    1,762,080
SPEED CHANGING MECHANISM
Filed April 16, 1929    2 Sheets-Sheet 1
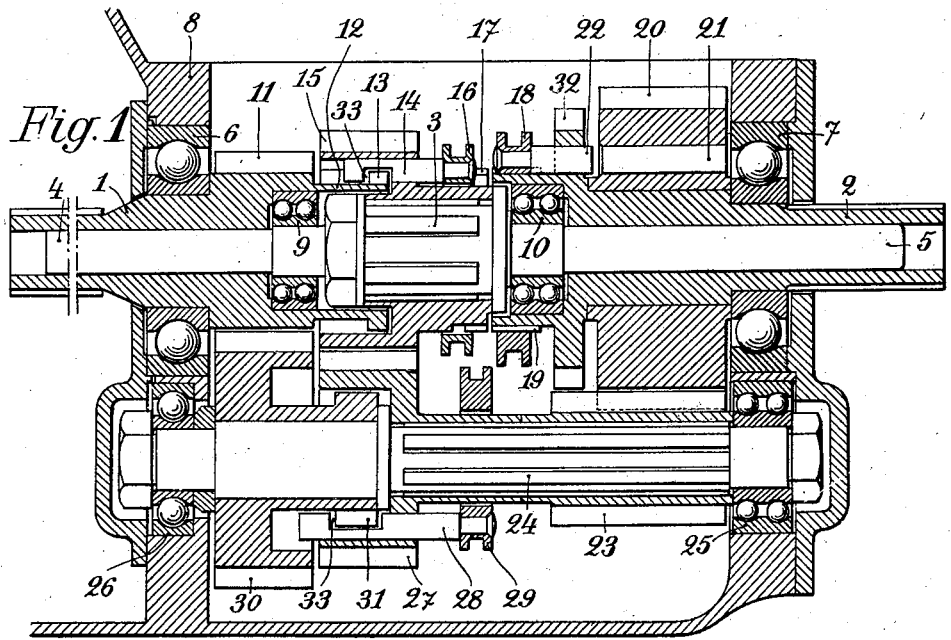
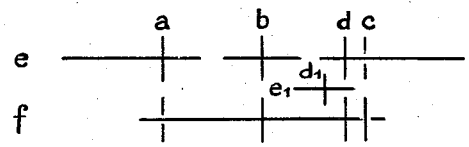
INVENTOR
Charles Schaeffer
BY
ATTORNEYS June 3, 1930.　　　C. SCHAEFFER　　　1,762,080
SPEED CHANGING MECHANISM
Filed April 16, 1929　　2 Sheets-Sheet 2

INVENTOR
Charles Schaeffer
BY
ATTORNEYS

Patented June 3, 1930

1,762,080

UNITED STATES PATENT OFFICE

CHARLES SCHAEFFER, OF PARIS, FRANCE, ASSIGNOR TO SOCIÉTÉ ANONYME DES ANCIENS ETABLISSEMENTS PANHARD & LEVASSOR, OF PARIS, FRANCE

SPEED-CHANGING MECHANISM

Application filed April 16, 1929, Serial No. 355,589, and in France April 21, 1928.

In such change gears as are employed on motor vehicles or like apparatuses there are generally provided four different direct running speeds, one of which is obtained through direct drive, and one back running speed. To secure the four direct running speeds, there are employed four sets of gears which comprise one so-called transmission set and one set for each of the first, second and third speeds, the fourth speed being obtained through direct drive.

It follows that eight gears are used for direct running only.

This invention has for its object a gear arrangement whereby a speed changing device may be designed which gives four direct running speeds with three pairs or gears only.

With this object in view, in contradistinction to what was done heretofore, the transmission gears do not serve only as idlers but are used in such manner that they themselves contribute to speed reduction. It follows that transmission wheels proper are no longer provided.

The transmission wheel is loosely mounted upon the second-motion shaft instead of being rigidly connected thereto, and one gear of each pair is likewise loosely mounted upon its shaft; these various gears may alternatively be made rigid with their shafts through suitable means.

The appended drawing shows by way of example an embodiment of the subject matter of the invention whereby four direct running speeds may be obtained by means of three pairs of gears.

Figure 1 is a vertical cross sectional view of such arrangement.

Figure 2 is a diagrammatical view showing the various combinations obtained in such conditions.

Figure 3:
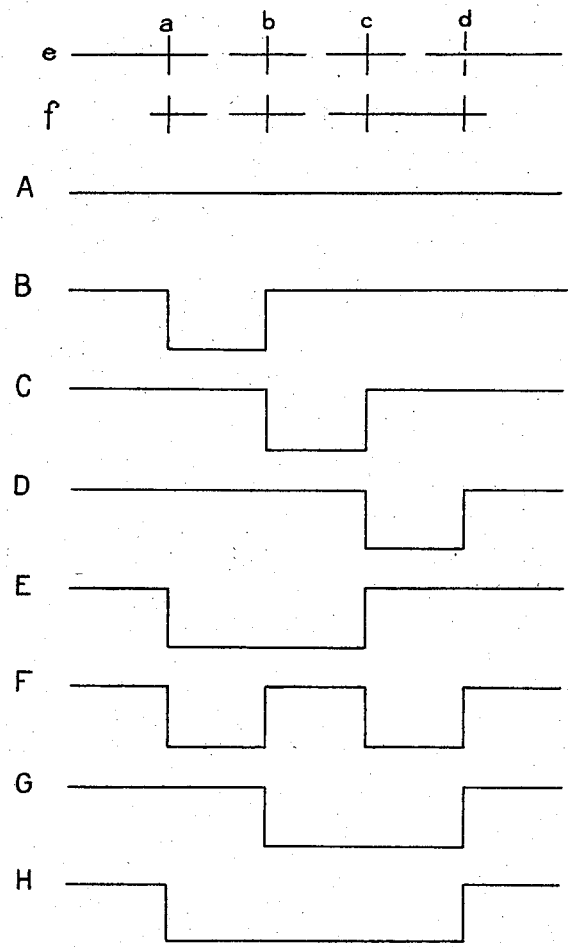

Figure 3 indicates those combinations which it is possible to obtain with a complementary set of gears.

In the embodiment shown in Figure 1, 1 designates the shaft which is connected to the engine, 2 being the driven shaft which is arranged in axial alinement with the former. An intermediate shaft 3 is arranged between the driving shaft and the driven shaft, and is centered therewith by means of cylindrical projections 4 and 5 which are made a snug fit in bores of shafts 1 and 2.

The shafts 1 and 2 are mounted through ball bearings 6 and 7 in a casing 8.

The intermediate shaft 3 rotates upon shafts 1 and 2 through ball bearings 9 and 10.

The pinion 11 of the driving shaft carries a projection 12 in the end of which recesses 13 are formed, into which fingers 14 mounted upon a sleeve 16 are adapted to engage. The shifting of said sleeves allows the engagement of the pinion with wheel 15 which is rigidly connected to the second-motion shaft 3 to be obtained.

Said wheel is provided at the extremity thereof with corrugations 17 whereby the connection thereof with the driven shaft 2 may be obtained through sleeve 18 which, by sliding upon the corrugations 19 of the driven shaft, becomes engaged into corrugations 17.

The wheel 20, which is loosely mounted upon the driven shaft, is provided with holes 21 into which the fingers 22 of the sleeve 18 are adapted to engage so as to rigidly connect wheel 20 with the driven shaft 2.

The wheel 20 intermeshes with pinion 23 which is immovably secured upon the second-motion shaft 24. Said shaft is carried in the casing 8 through ball bearings 25 and 26.

The pinion 27 is likewise immovably secured upon the second-motion shaft. It is provided with holes into which the fingers 28 of sleeve 29 are engaged, thus allowing the wheel 30 which is loosely mounted upon the second-motion shaft 24 to be rigidly connected to said shaft. For this purpose, said fingers fit into recesses 31 provided in the hub of the wheel.

It is to be noted that each of fingers 14 and 28 is formed with a notch 33 which allows the projections formed intermediate to the recesses to freely pass over to the "stop" position; such arrangement allows the fingers to be engaged into the recesses in both directions of displacement of their sleeves.

In the embodiment shown, considering that the gears are permanently intermeshed, any form of teeth, e. g. spur, or helical, or herringbone teeth, etc., may be employed.

In Fig. 2, the vertical lines $a$, $b$, $c$ diagrammatically indicate in their respective positions the three pairs of gears allowing the direct running speeds to be secured; the vertical lines $d$ relate to back running.

The horizontal line $e_1$ represents the intermediate shaft which carries the pinion $d_1$ for back running, which pinion is not shown in Fig. 1.

The horizontal lines $e$ and $f$ diagrammatically show in their respective positions the shafts of the mechanism.

A, B, C, D, E diagrammatically indicate the connections of the various gears with their shafts, corresponding to the four direct running speeds and back running.

In throwing into gear of any one of the speeds the procedure is as follows:—

In setting up the fourth speed or direct drive A, the sleeves 16 and 18 are thrust toward the left, whereby on one hand the fingers 14 are made to engage into recesses 13, thus rigidly connecting the driving shaft 1 and the intermediate shaft 3 with each other, and on the other hand the sleeve 18 is placed into an overlapping position with respect to corrugations 17 and 19, thus connecting the intermediate shaft 3 with the driven shaft 2. All three shafts then are rigidly connected with one another and the driving shaft imparts its motion to the driven shaft directly, as diagrammatically shown at A in Fig. 2.

In setting up the third speed B, the sleeves 18 and 29 are shifted to the left, whereby on one hand the fingers 28 are made to engage into the recesses 31, thus rigidly connecting the wheel 30 with the second-motion shaft 24, and on the other hand the sleeve 18 is placed into an overlapping position with respect to corrugations 17 and 19, thus connecting the intermediate shaft 3 to the driven shaft 2. The driving shaft then imparts its motion through gears 11 and 30 to the second-motion shaft which transmits same to the driven shaft through gears 27 and 15 according to line B of Fig. 2.

In setting up the second speed C, the sleeves 16 and 18 are thrown to the right, whereby on one hand the fingers 14 are made to engage into the recesses 13, thus rigidly connecting the power shaft 1 to the intermediate shaft 3 and on the other hand the fingers 22 are introduced into the holes 21, thus rigidly connecting the wheel 20 to the driven shaft 2; the power shaft then transmits its motion through gears 15 and 27 to the second-motion shaft, thence to the driven shaft through gears 23 and 20 according to line C of Fig. 2.

In setting up the first speed D, the sleeves 18 and 29 are shifted to the right, thereby causing the engagement on one hand of fingers 28 into recesses 31, whereby the wheel 30 becomes rigidly connected to the second-motion shaft 24, and on the other hand of fingers 22 into recesses 21, whereby the wheel 20 becomes rigidly connected to the driven shaft 2; the power shaft thus imparts the driving motion through gears 11 and 30 to the second-motion shaft which, in turn, transmits it to the driven shaft through gears 23 and 20 according to line D of Fig. 2.

In setting up for backward running, the sleeve 29 is thrown to the right so as to engage fingers 28 into recesses 31 and, by shifting sleeve 29 further to the right, an intermediate pinion which is not shown in the drawing is likewise thrown into engagement with gears 23 and 32. The power shaft thus imparts its motion through gears 11 and 30 to the second-motion shaft, thence to the driven shaft through the gear 23, the intermediate gear and the gear 32 according to line E of the diagram shown in Fig. 2.

The operation of the sleeves and intermediate wheel may be provided for, as usual, by means of forks actuated through a lever but, obviously, any other means might be used to secure the same result.

In Fig. 3, the vertical lines $a$, $b$, $c$, $d$ represent four pairs of gears whereby the direct running combinations may be secured. The gears for back running, which is obtained in a manner similar to that described hereinbefore, are not shown.

The horizontal lines $e$ and $f$ represent the upper and lower shaft lines.

A, B, C, D, E, F, G, H show the connections of the various gears with their shafts, corresponding to the direct running speeds, there being provided eight such speeds in the case considered.

By comparing Figs. 2 and 3 it will be appreciated that the number of combinations increases rapidly in relation to the increase in the number of gears used, whereby a speed changing device may be obtained which provides a great number of speeds with few gears.

Claim:

A speed changing mechanism comprising on one and the same line a power gear, an intermediate gear and a driven gear, a driven shaft alined therewith, a second-motion shaft parallel with said line, two pinions secured upon said second-motion shaft and intermeshed with the intermediate and driven gears respectively, a loose second-motion pinion on said second-motion shaft, and coupling means adapted to couple firstly the power pinion with the intermediate gear, secondly the intermediate gear with the driven shaft, thirdly the driven pinion with said driven shaft and fourthly said second-motion pinion with said second-motion shaft, said means being operatable independently from one another.

In testimony whereof I have hereunto affixed my signature.

CHARLES SCHAEFFER.